Patented July 30, 1935

2,009,463

UNITED STATES PATENT OFFICE 2,009,463

MANUFACTURE OF FUEL BRIQUETTES

Robert Erwin Windecker, Painesville, Ohio

No Drawing. Application July 27, 1932,
Serial No. 625,206

10 Claims. (Cl. 44—15)

This invention relates to a new process for briquetting fuel material, such as slack coal or other carbonaceous fuels. The object of the invention is to obtain an efficient economical fuel by means of a particular binder.

In the manufacture of fuel briquets, there are several factors of importance, each of which presents difficulties. These are: 1. The briquettes should hold their form, so that they can be handled easily while green. 2. They should be substantially hard and resist crumbling after they are dried. 3. They should give as little ash as possible, and give off no objectionable odors when properly burned. 4. They should be weatherproof and waterproof. 5. They should not adhere to the molds of the briquetting machine when molding machines are employed. 6. The fuel should be economical.

Heretofore such briquets have been made by the use of certain water soluble binders, such as glues, starch, molasses, sugars, etc., or by the use of mineral cements in quantities varying from 4% to 8%, which yield a considerable amount of ash, or by using bituminous and resinous materials in quantities greater than 5%, which on burning give off considerable smoke. Cellulose materials have also been used, but they require a large percentage of material to produce a strong briquet.

I have discovered that a water-insoluble gummy substance, preferably in the form of a water dispersion, is an ideal material for binding carbonaceous fuels. Such gums include natural latex from India rubber, gutta-percha, balata, etc., or an artificial aqueous dispersion of such rubbers made by working the crude rubber or its solution, or vulcanized scraps, etc., with water in the presence of a dispersing agent, such as soaps, ammonia, alkali hydroxides, etc., with or without a protective colloid, such as casein, glue, agar-agar, etc. The preparation of any such artificial dispersions of rubber is not part of my invention, since such dispersions are well known, and can be obtained in the open market.

The latex binder, whether natural or artificial, can be employed in diluted or concentrated form. Ordinary natural latex contains approximately from 33% to 38% of rubber substance which makes good adhesive. This latex rubber is dispersed in a water medium, and is ordinarily preserved with ammonia to prevent its coagulation due to bio-chemical changes in the dispersion. Such a latex can now be concentrated into a stable latex paste or cream which may contain from 50% to 80% of rubber. Artificial latex can also be made of such concentration.

I have discovered that when even such small quantities as 0.2% to 0.5% of rubber in an above mentioned form are properly mixed with coal and briquetted, a very compact and resistant briquet is obtained. These latex substances are easily mixed with the slack coal or other carbonaceous fuels when it is dry or damp, and its rubber is so dispersed throughout the mass that the maximum strength and resistance to shock may easily be obtained.

This type of binder has the advantage that no ash is left on burning, and that very little or no odor is caused when the coal is properly burned. A form of natural rubber such as latex has the advantage that the material costs less than many other known binders, due to the small amount used, and may be diluted with water before use, with or without the addition of a small amount of ammonia at the place of use, to give a quantity of water sufficient for the production of the most compact briquet, the amount of water used in diluting the latex emulsion being inversely proportional to the amount of moisture already present in the coal to be briquetted.

There are two general ways in which the latex binder can be incorporated in the fuel. If a normal latex of 30% to 38% rubber content is employed, then this latex can be diluted to such an extent that when dry coal slack is intermixed therewith, there is obtained a thick paste which can be easily molded into briquets. On the other hand, if a concentrated latex of 60% or more rubber is employed, then it is desirable that the powdered carbonaceous fuel be made into a thick paste with water containing a little ammonia—about 0.5% to 1.0%—and then mixed with the concentrated latex, and if the resulting mixture is too thin, then intermix therein an additional quantity of dry powdered fuel until a very thick, semi-dry paste is obtained, which is easily molded into briquets. It is understood that any substitute for ammonia which will prevent premature coagulation of the form of rubber used may be substituted for ammonia.

The following examples are given by way of illustration:

*Example 1.*—About 2000 lbs. of dry coal slack are introduced in any ordinary mixer provided with paddles or screw mixer, and into this there are added about 0.3% to 0.6% of rubber in the form of latex of 33% rubber, which is conveniently diluted to give from 20 to 25 gallons of the dispersion, which is gradually incorporated into the powdered fuel. An additional quantity of ammonia may be added to the ammonia-preserved latex, so that the rubber will not coagulate in contact with the coal. The mixer can be so arranged that its discharge end is over the charging top of the briquetting machines, so that the thick paste is introduced into the briquetting machine without any additional handwork operation. The molded briquet can immediately be dumped over a metal conveyor which is heated at 90° to 100° C. so that any moisture will evaporate, thus making the rubber irreversible, thus giving to the briquet the maximum strength and waterproofing quality desirable in such a fuel, in a few minutes' time. The effect of the heat treatment of the briquets after formation may also be accomplished by allowing the briquets to stand at an ordinary temperature for a longer time.

*Example 2.*—1000 lbs. of coke breeze are placed as above in the mixer and water is gradually added, with agitation until a thick paste of the fuel is obtained. Into this paste there is added about 0.2% to 0.5% of ammonia, and a concentrated latex or dispersion of about 60% rubber is now intermixed in such a proportion that the rubber content, based on the weight of the dry fuel, is from 0.1% to 1%. If the resulting mixture is too thin, an additional quantity of dry coke powder is added until a thick moldable paste containing not over 30% moisture is obtained, which is briquetted as above. The briquetting, however, can also be made by extruding the fuel paste into rods which are cut, as extruded, into the desired size, and allowed to fall on a conveyor which is led into a drying oven kept at the required temperature to dehydrate the briquet and coagulate the rubber.

The percentage of rubber in the form of dispersion or latex which may be used with coal or other bulk materials to make briquets varies considerably with the strength required in the briquets. Percentages as low as 0.1% to 0.4% give sufficient strength for handling, and 0.2% of rubber gives sufficient strength in a 3-inch cylindrical briquet after a day's aging at normal temperature to bear the weight of an average man without cracking or crumbling. With the increase of rubber, the strength increases. I have found that percentages of from 0.5% to 2.0% give very strong, resistant briquets. The invention is not limited to the use of any particular percentage of rubber but may vary from about 0.1% upwards, depending upon the degree of strength required in the briquets, as well as the economics of the process.

This invention includes the use of other binding materials in connection with the use of rubber latex and dispersed rubber. For example, the coal slack or other material may be mixed with one-half the usual amount of hydraulic cement and then a small amount of rubber latex added in while mixing. For example, a charge of slack coal may be mixed dry or moist with about 1% to 3% of hydraulic cement and then moistened further with water and then about 0.1% to 0.5% rubber in the form of rubber latex added and mixed in, or the latex or dispersion may be diluted with sufficient water to make the mixture workable before adding it to the fuel mixture. The resulting briquet will have strength properties due to both the cement and the rubber and will have the anti-dusting properties due to the rubber and the slower burning properties due to the cement. The materials which may, according to the invention, be mixed with or added as a binder to the material to be briquetted in addition to rubber latex or dispersed rubber are tars, asphalts, waxes, sugars, starches, glues, soluble silicates, cements and the like. These substances are preferably added dry or in water solution or suspension, depending upon which is used.

The use of rubber as a dispersion or latex is not limited to the manufacture of small briquets, but includes the manufacture of any pressed block or object in which the rubber dispersion or latex is a considerable constituent of the binding material. Instead of latex, there may also be used rubber in the form of solution, or melted with bitumen, resin, etc. Thus, it can be used to bind any pulverized material. One particular application would be to use the limestone fines, molding them into granules of desired shape, suitable for roofing granules. In fact, it has been found out that if such waste limestone powders are mixed with about 0.5% to 2.0% of rubber in the form of latex, and then molded as described in patent literature, dried, dipped in a colored solution of salts or casein, glue, gelatin, lacquer, etc., there are obtained beautiful colored granules, which when applied over asphalt shingles or roofing elements give to the roof a very attractive appearance. When these coated granules are made waterproof by insolubilizing the colored coating, there is produced an ideal and practical roofing material. Another application of the invention is to bind wood shaving and powder into kindling briquets, the briquetting being carried out as described for the making of coal briquets. But when using these kinds of cellulose material, the amount of latex rubber should be between 0.5 to 5.0% of the weight of the cellulose, and small quantities of cements, glue, etc., may be also added.

I have also discovered that when a small percentage of sulfur, to which a small amount of accelerator may be added, is added to the latex or dispersion or to the mix at any time while mixing, and when this mix is briquetted and subsequently heated, the latex is not only coagulated and the moisture evaporated, but the rubber is vulcanized and the briquet thereby strengthened. I do not wish to limit the invention to any given percentage of sulfur, as different percentages will produce briquets of different qualities for different purposes. However, the most advantageous percentages may vary from about 2% to 3% of sulfur, based on the weight of rubber used.

I claim:

1. The method of briquetting powdered solid carbonaceous fuel, comprising mixing with the powdered fuel a sufficient quantity of an aqueous dispersion of rubber to bind the powder into an easily moldable, coherent putty paste, and briquetting the paste.

2. The process of manufacturing solid fuel briquets, which comprises mixing powdered solid carbonaceous fuel with a small quantity of an aqueous dispersion of rubber, working the mass into a thick paste, and briquetting the paste.

3. The process of manufacturing coal briquets, comprising mixing slack coal, 0.1% to 2.0% of rubber in the form of rubber latex, and sufficient water to make a mixture of the best briquetting qualities, subsequently pressing the material into briquets, and storing until the briquets have hardened.

4. The process for briquetting solid carbonaceous fuels, which consists in moistening the fuel, intermixing with this fuel a sufficient quantity of a diluted dispersion of rubber to bind the fuel slack, working the mixture into a paste, partially dehydrating the paste to give a thick putty, molding the briquets, and dehydrating them with simultaneous coagulation of the rubber, whereby a dustless, non-crumbling and efficient burning briquet is obtained.

5. The process of making briquets from coal slack, which comprises mixing with a large quantity of coal slack from 0.1% to 1.0% of rubber in the form of diluted latex, working the mixture into a thick putty, molding the briquets of the desired size and shape, and making the rubber irreversible by heat, whereby a non-crumbling, smokeless briquet is obtained.

6. The process of manufacturing solid fuel briquets from powdered solid carbonaceous material, which comprises making a thick paste of the powdered material, and working into it sufficient concentrated latex to give to the briquet about 0.5% to 2.0% of rubber, calculated on the dry weight of the fuel powder, regulating the moisture consistency, molding the briquets, and heating them to coagulate the rubber.

7. The process for making briquets from coke breeze, which comprises mixing 1000 lbs. of coke breeze with water and about 1 to 10 lbs. of rubber in the form of a substance of the class comprising rubber latex and dispersed rubber, the quantity of water added being sufficient to form a pasty mass of the best briquetting qualities, subsequently pressing briquets, and drying the briquets formed.

8. The method of making solid fuel briquets, which comprises wetting combustible powdered carbonaceous fuel with water in the form of a thick slurry, adding into the slurry about 0.5 to 2% of rubber in the form of a concentrated aqueous dispersion, briquetting the resulting putty, and drying the briquets.

9. The process of making briquets from coal slack, which comprises mixing 2000 pounds of coal slack with about 6 to 12 pounds of rubber in the form of about 33% rubber latex which has been diluted with water containing about 4 to 10 pounds of ammonia liquor, to give about 20 to 25 gallons of the dispersion, and then pressing and drying the fuel mixture to produce fuel briquets of high quality.

10. The process of making briquets from coke breeze, which comprises working the coke dust with water into a thin paste, adding a small quantity of ammonia into the paste to impart to it a slight alkalinity, intermixing with it about 0.1% to 1.0% of rubber in the form of concentrated latex, dehydrating the mass to obtain a thick putty, briquetting, and subjecting the briquets to sufficient heat to dehydrate them and coagulate the rubber.

ROBERT ERWIN WINDECKER.